United States Patent [19]
Gallenberg

[11] Patent Number: 6,094,847
[45] Date of Patent: Aug. 1, 2000

[54] BEACH CLEANING APPARATUS AND METHOD

[76] Inventor: Ronald J. Gallenberg, W9112 Cherry Rd., Antigo, Wis. 54409

[21] Appl. No.: 09/143,495

[22] Filed: Aug. 28, 1998

[51] Int. Cl.[7] .................. E02F 3/65; E02F 3/08; A01B 33/00
[52] U.S. Cl. .................. 37/422; 37/424; 37/431; 37/432; 37/463; 37/464; 171/38; 171/65; 171/118; 171/DIG. 2
[58] Field of Search .................. 171/DIG. 2, 38, 171/64, 65, 118, 144; 37/190, 422, 424, 431, 432, 463, 464, 465

[56] References Cited

U.S. PATENT DOCUMENTS

| | | | |
|---|---|---|---|
| 916,479 | 3/1909 | Normandin | 171/118 |
| 994,513 | 6/1911 | Herbert | 171/118 |
| 1,313,053 | 8/1919 | Beard | 171/118 |
| 1,578,600 | 3/1926 | Greatrix | 171/118 |
| 2,110,997 | 3/1938 | Mayfield | 171/64 |
| 2,296,851 | 9/1942 | Henry | 171/64 |
| 2,747,354 | 5/1956 | Bloser | 171/118 |
| 2,976,936 | 3/1961 | Fry | 171/64 |
| 3,316,977 | 5/1967 | Snook | 171/64 |
| 3,353,342 | 11/1967 | Hill et al. | 171/118 |
| 3,521,710 | 7/1970 | Tillotson | 171/38 |
| 3,831,299 | 8/1974 | Kelley | 37/191 A |
| 3,991,493 | 11/1976 | Orth | 37/7 |
| 4,482,019 | 11/1984 | Murphy | 171/63 |
| 5,497,569 | 3/1996 | Byman | 37/410 |

FOREIGN PATENT DOCUMENTS

| | | | |
|---|---|---|---|
| 72547 | 4/1916 | Austria | 171/118 |
| 0 277 739 A1 | 1/1988 | European Pat. Off. | 171/64 |
| 61990 | 9/1951 | France | 171/118 |
| 1393327 | 5/1988 | U.S.S.R. | 171/65 |

*Primary Examiner*—Eileen Dunn Lillis
*Assistant Examiner*—Gary S. Hartmann
*Attorney, Agent, or Firm*—Dorsey & Whitney LLP

[57] ABSTRACT

A method and apparatus for cleaning beaches or other similar sandy areas which includes a digger chain and an associated sweeper chain for capturing debris and other articles and conveying the same to a collection box or separation conveyor.

19 Claims, 12 Drawing Sheets

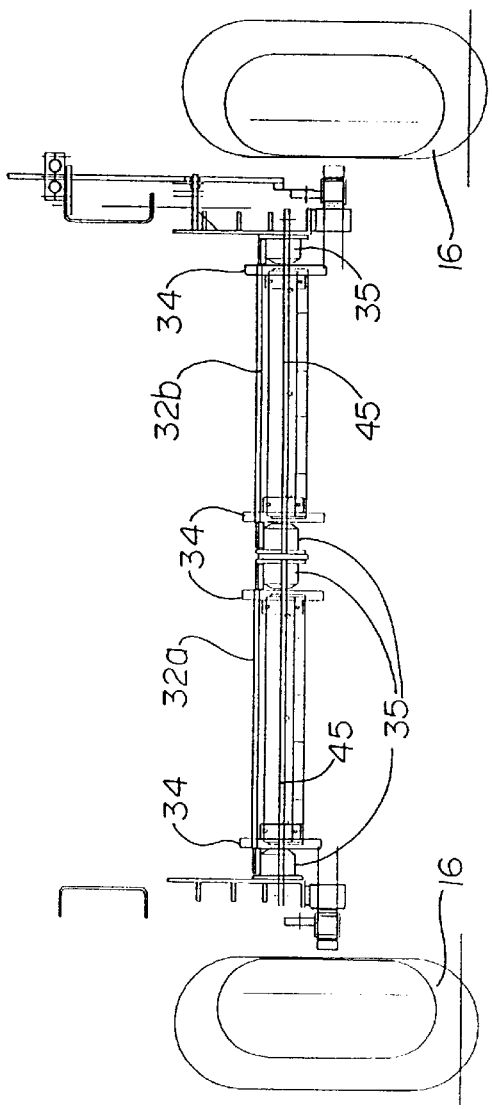

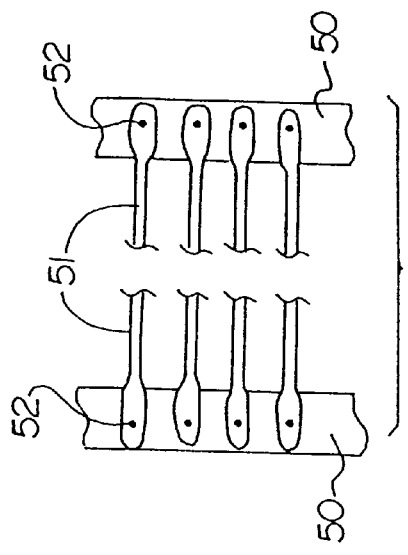
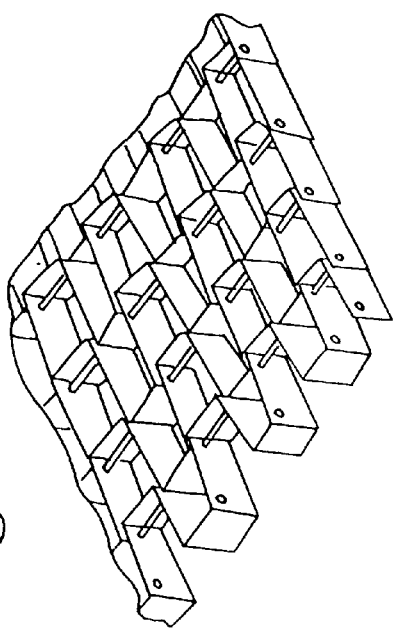
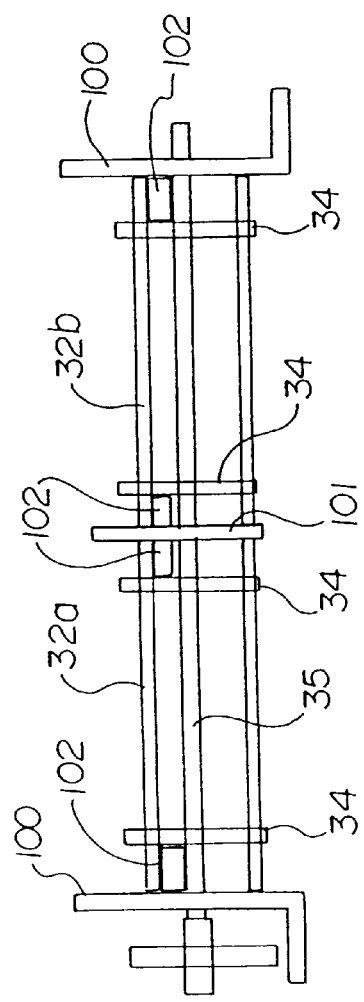
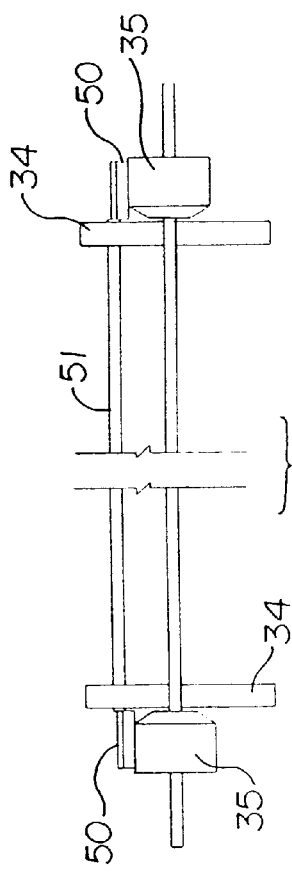

BEACH CLEANING APPARATUS AND METHOD

BACKGROUND OF THE INVENTION

1. Field of the Art

The present relates generally to an apparatus and method for cleaning beaches and other sandy areas, and more particularly, to a beach cleaning method and apparatus which includes a unique chain combination to improve the cleaning efficiency and an improved structure for emptying the collection box.

2. Description of the Prior Art

A significant problem at beach resorts and other beach areas, both public and private, involves the maintenance and cleaning of the beach on a regular (usually daily) basis. After a day of heavy use, a popular beach is often littered with a beer and pop cans, bottles, wrappers and other debris. Unless such beaches are cleaned and groomed on a regular basis, the frequency of their use soon diminishes.

In many areas, beaches and beach areas are cleaned manually by hired workers physically picking up the debris and then raking the sand. This is time consuming and quite expensive. Further, in some areas, such help is simply not available. This has led to the development of various pieces of beach cleaning equipment for cleaning beaches. In general, many of these prior devices have used a hay rake type concept with spring teeth and a hopper or a single conveyor belt or chain for conveying the debris from the sand to a collection bin or the like. While these prior machines are satisfactory in many respects, there is a need for an improved beach cleaning method and apparatus which is easy to operate, is fast, has low maintenance and is cost competitive.

SUMMARY OF THE INVENTION

The present invention relates generally to a beach cleaning method and apparatus or implement which is fast, is easy to operate, has low maintenance costs and results in an extremely clean beach with a smooth finish. More specifically, the implement of the present invention includes a pair of belts or chains in the form of a digger chain mounted on a digger section of the implement and a sweeper chain which is positioned forward of and above the digger chain. The digger chain is designed to skim the sand surface or to dig into the sand for the purpose of lifting the trash and debris out of the sand and conveying it to a separation chain or collection box. The sweeper chain is positioned above the digger chain and moves in the same direction to assist in capturing the trash and debris and conveying it up the digger chain.

The invention also includes an improved means in the form of a modified parallelogram linkage for lifting the collection box and dumping the same into a truck bed or the like.

Accordingly, it is an object of the present invention to provide a beach cleaning implement which is fast and easy to operate and which efficiently cleans a beach or other similar area.

Another object of the present invention is to provide a beach cleaning implement with a combination digger and sweeper chain for capturing the debris and for conveying the debris to a separation chain and/or collection box.

A further object of the present invention is to provide a beach cleaning implement having an improved mechanism for raising and dumping the collection box when desired.

A still further object of the present invention is to provide an improved method for cleaning beaches or similar areas utilizing the above described implement.

These other objects of the present invention will become apparent with reference to the drawings, the description of the preferred embodiment and the appended claims.

DESCRIPTION OF THE DRAWINGS

FIG. 7 is a view showing the digger section and the digger chain as viewed from the forward end of the digger section.

FIG. 8 is a top elevational view of a plurality of slider pans usable with the digger section.

FIG. 13 is a view showing the digger section and chain as viewed from the rearward end of the digger section.

FIG. 14 is a top elevational view of the belted chain used for the digger belt and the sweeper belt in accordance with the present invention.

FIG. 15 is a view, partially in section, showing the driving relationship between the drive sprockets and the digger and sweeper belts.

FIG. 16 is an isometric view of a section of the secondary separation belt for use in the implement of the present invention.

DESCRIPTION OF THE PREFERRED EMBODIMENT

Figure 1:
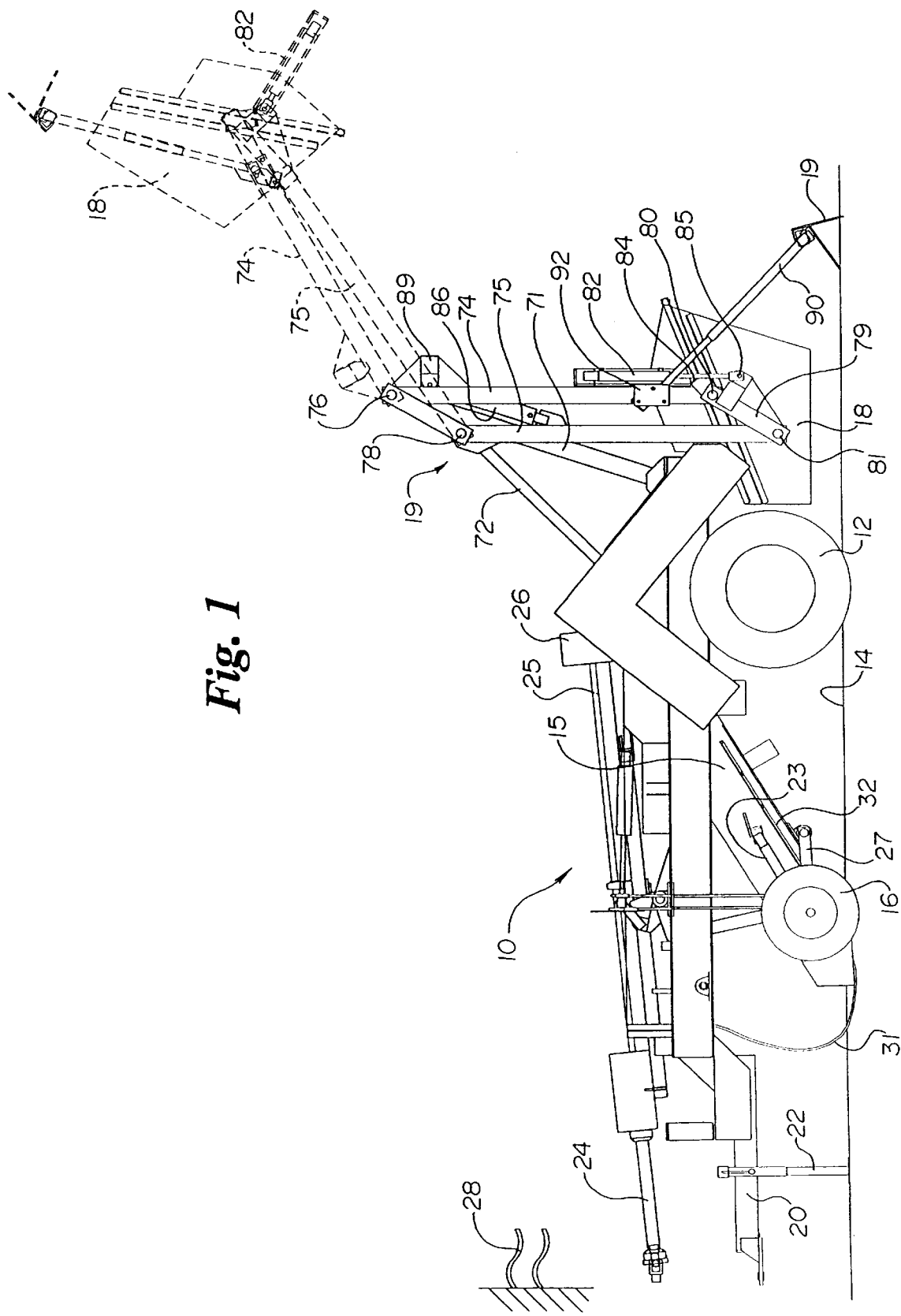
FIG. 1 is an elevational side view of a tractor towed beach cleaning implement in accordance with the present invention.

Reference is initially made to FIGS. 1–6 illustrating various views of both a tractor towed implement (FIGS. 1 and 2) and a self-propelled implement (FIGS. 3, 4, 5 and 6) of a beach or other similar cleaning apparatus in accordance with the present invention. In general, the implement 10 includes a main horizontal frame 11 and a pair of rear support wheels 12 positioned on opposite sides of the implement 10 and supporting the frame 11. The implement 10 also includes a forwardly and downwardly extending digger section 15. The digger section 15 is connected with the frame 11 for movement between a down or operative position (shown in FIG. 11) in which the forward end of the section 15 is lowered to a point at or below the beach surface 14 and an up or transport position in which the forward end of the digger section 15 is raised above the surface 14. The forward end of the digger section 15 is supported by a pair of wheels 16 on opposite sides of the section 15. The wheels 16 are mounted on pivot bars 27 whose position can be adjusted by extension and retraction of the cylinder 23.

Figure 3:
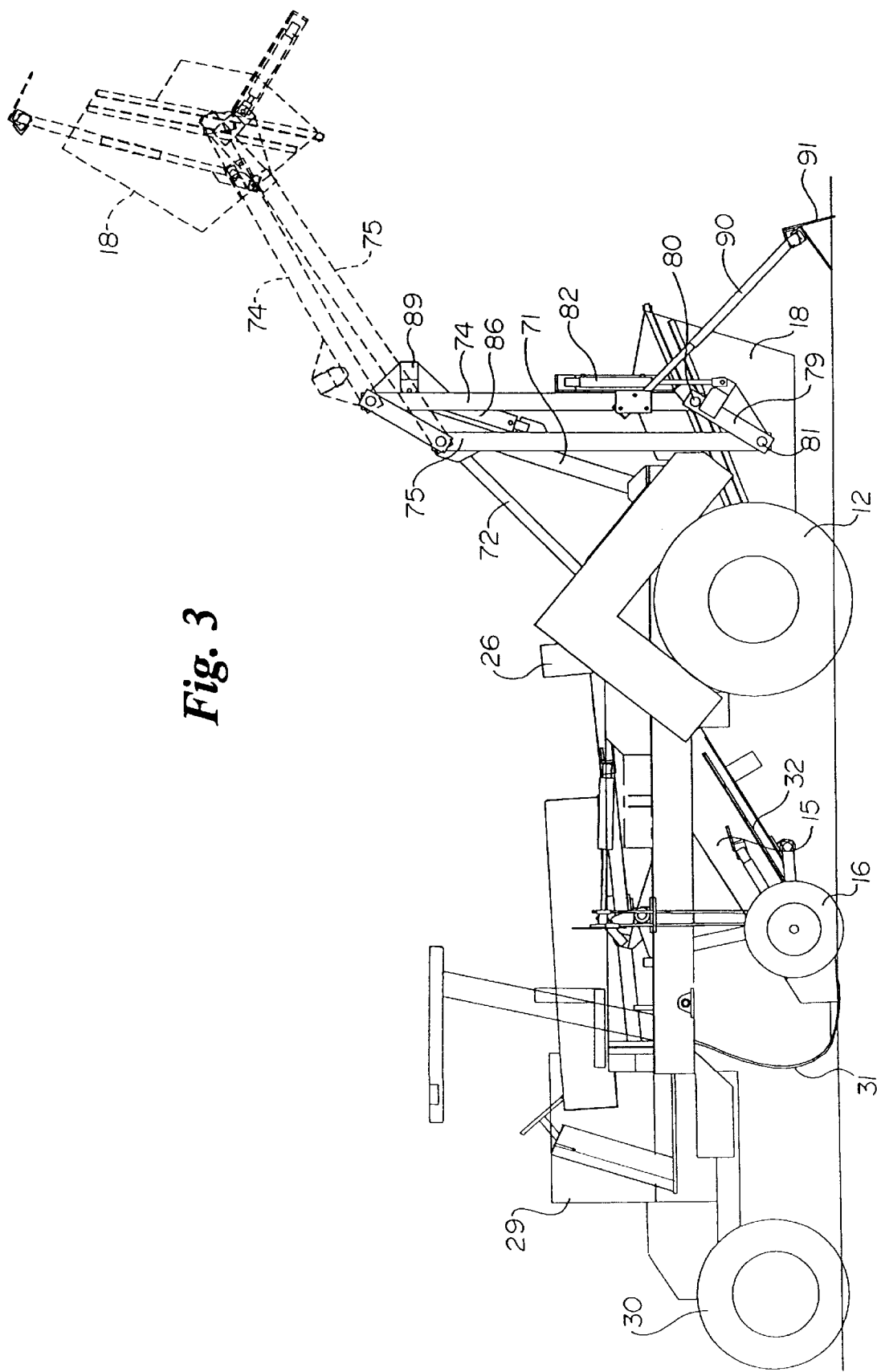
FIG. 3 is an elevational side view of a self-propelled beach cleaning implement in accordance with the present invention.
Figure 4:
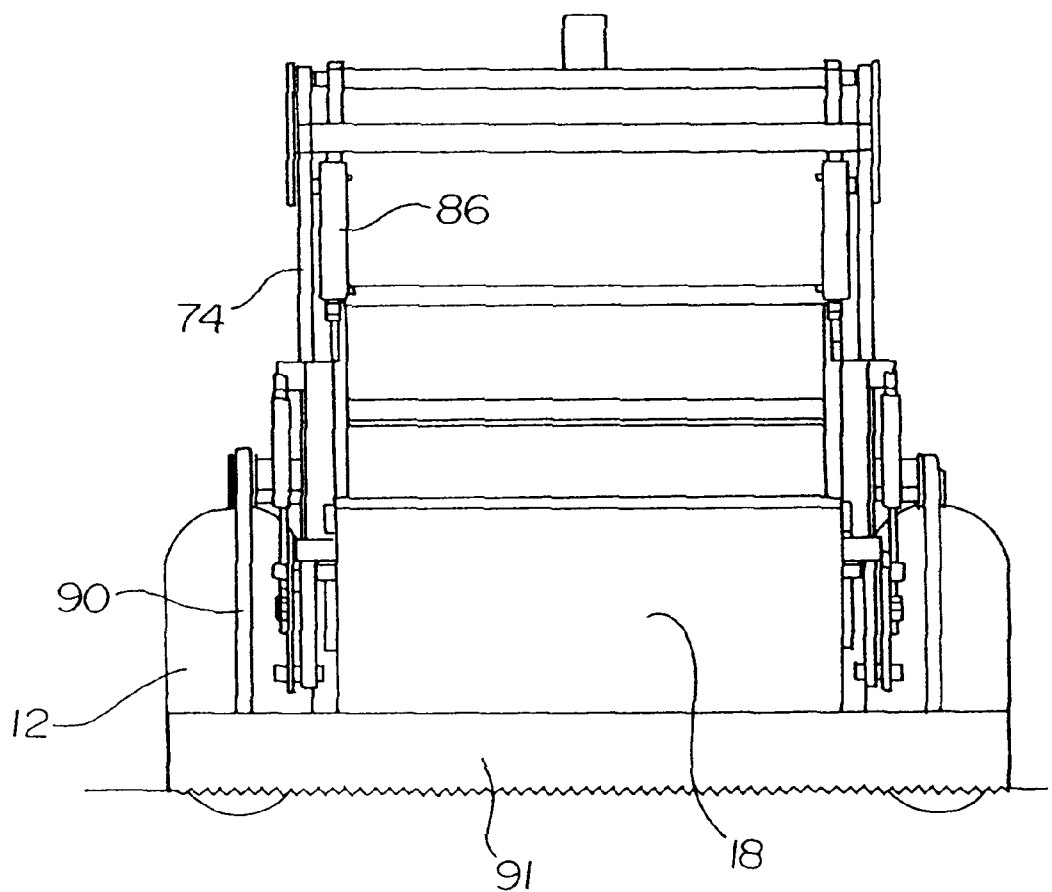
FIG. 4 is an elevational rear view of the beach cleaning equipment of FIG. 3.
Figure 5:
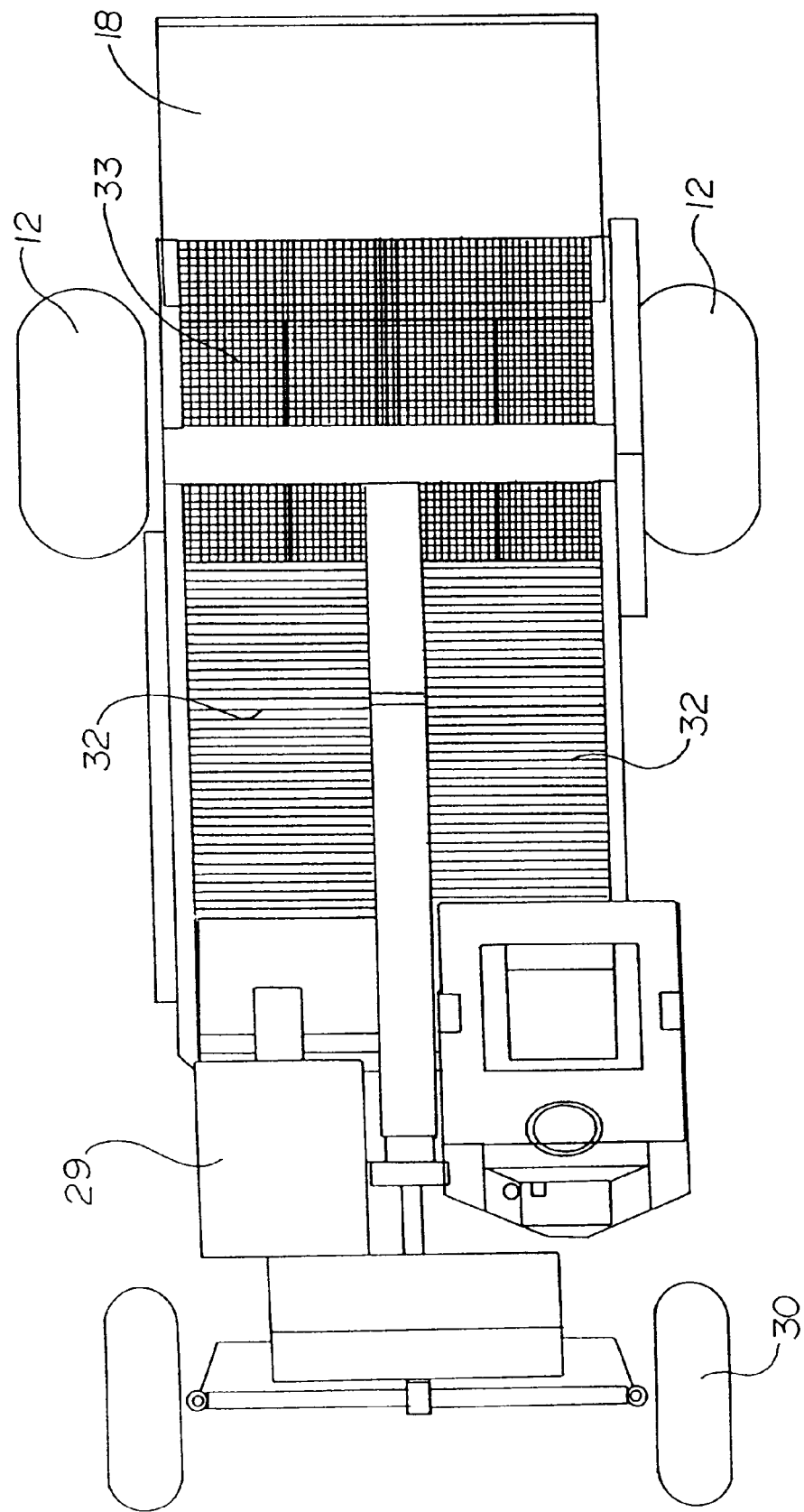
FIG. 5 is an elevational top view of a beach cleaning implement similar to that of FIG. 3, with the collection box lifting mechanism removed
Figure 6:
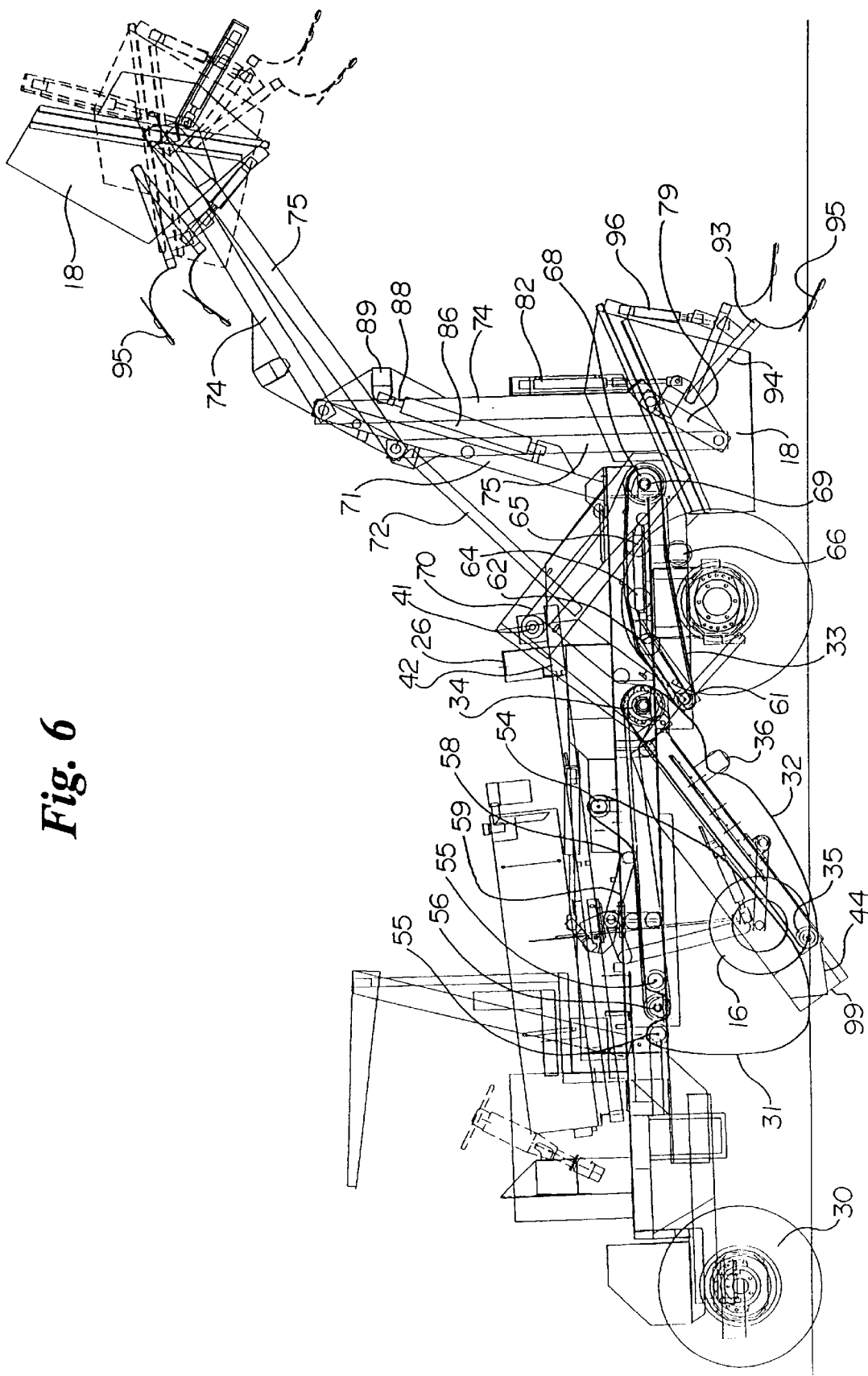
FIG. 6 is a side view of the implement as shown in FIG. 3 with parts removed.

The rearward end of the vehicle 10 is provided with a collection box or hopper 18 and a mechanism 19 for raising the box 18 to the position illustrated in broken lines in FIGS. 1, 3 and 6 and emptying its contents into a truck or other container.

In the pull-type embodiment of FIG. 1, the forward end of the implement 10 includes a conventional hitch member 20 for connection to a towing tractor or other vehicle in a conventional manner. The hitch member 20 is connected with the frame 11 via connecting members 21 through welding or other means and is supported in a non-operative position by a jack 22 or other support. The pull-type embodiment of FIG. 1 also includes a power takeoff (PTO) drive 24 for connection to the drive mechanism of the towing vehicle. A drive shaft 25 is connected with an end of the PTO drive 24 for transmitting rotational movement to a gear box 26 for driving the plurality of chains/belts of the implement as described in greater detail below. The towing vehicle includes a source of hydraulic fluid power which is provided to the implement 10 via a plurality of hydraulic hoses 28 in a conventional manner.

Figure 2:
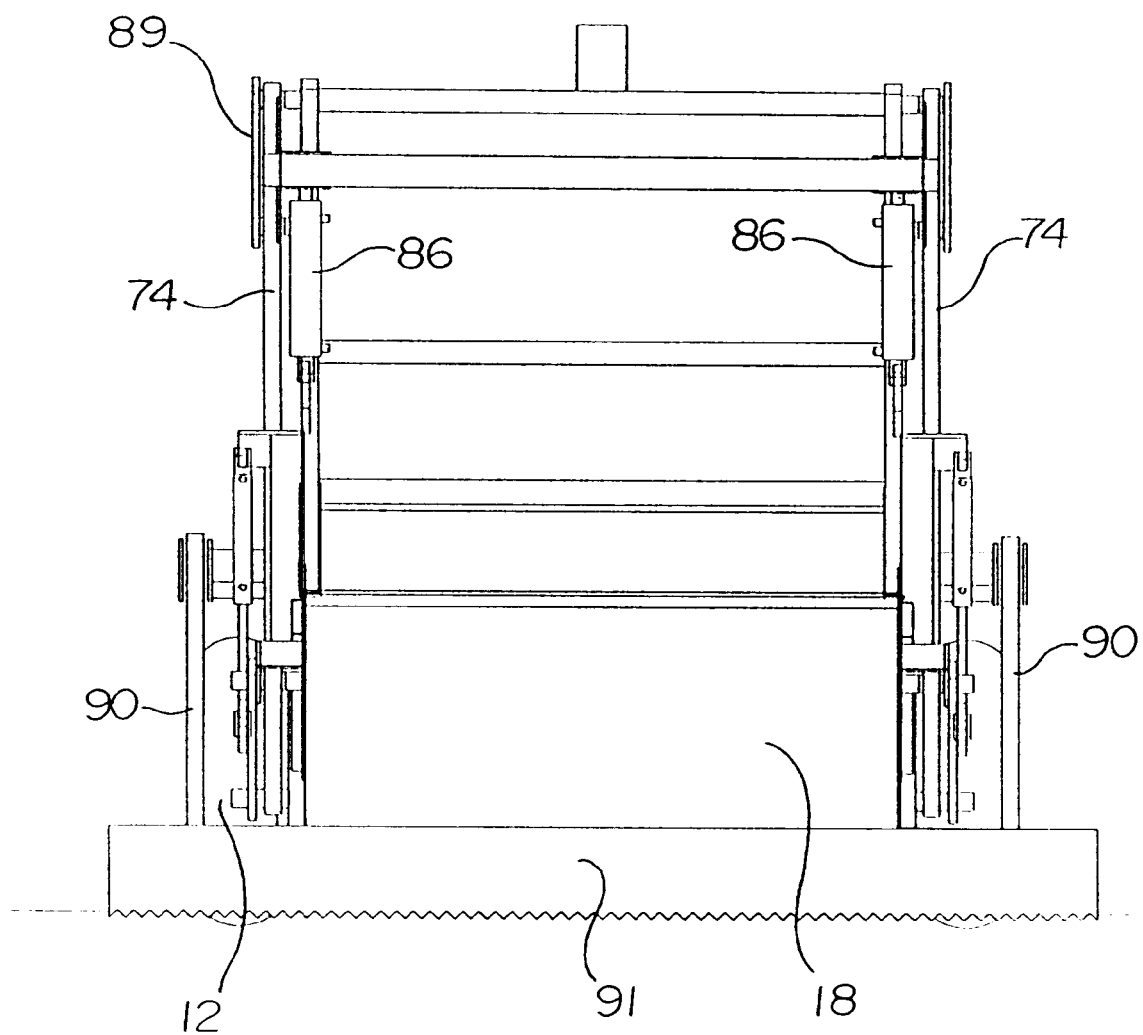
FIG. 2 is an elevational rear view of the beach cleaning implement of FIG. 1.

The self-propelled embodiment illustrated in FIGS. 3–6 is similar to the pull-type embodiment of FIGS. 1 and 2 except that the self-propelled embodiment includes its own power/drive vehicle 29 connected directly to the frame 11. The vehicle 29 includes a pair of forward support wheels which may be driven. In place of the PTO drive 24 of FIGS. 1 and 2, the self-propelled embodiment includes a hydraulic motor 26 for driving the chains/belts of the implement during operation. The self-propelled unit also includes a source of hydraulic power and a plurality of hydraulic hoses (not shown) for driving the hydraulic motor and for operating the various lift cylinders in the manner described more specifically below.

Figure 9:
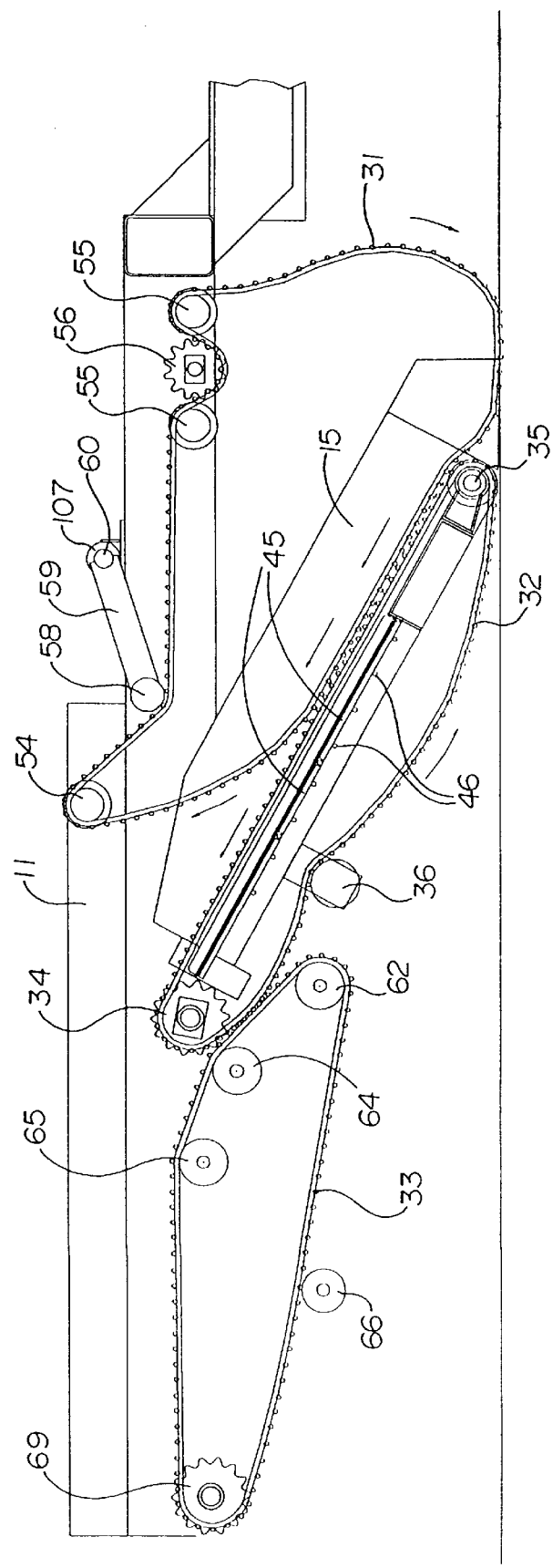
FIG. 9 is a side elevational view showing the chain combination and movement in the beach cleaning apparatus of the present invention.

The pick-up and collection chains of the present invention are shown best in FIGS. 6 and 9 and include an endless sweeper chain 31, and endless digger chain supported by the digger section 15, and a separation chain 33.

Figure 10:
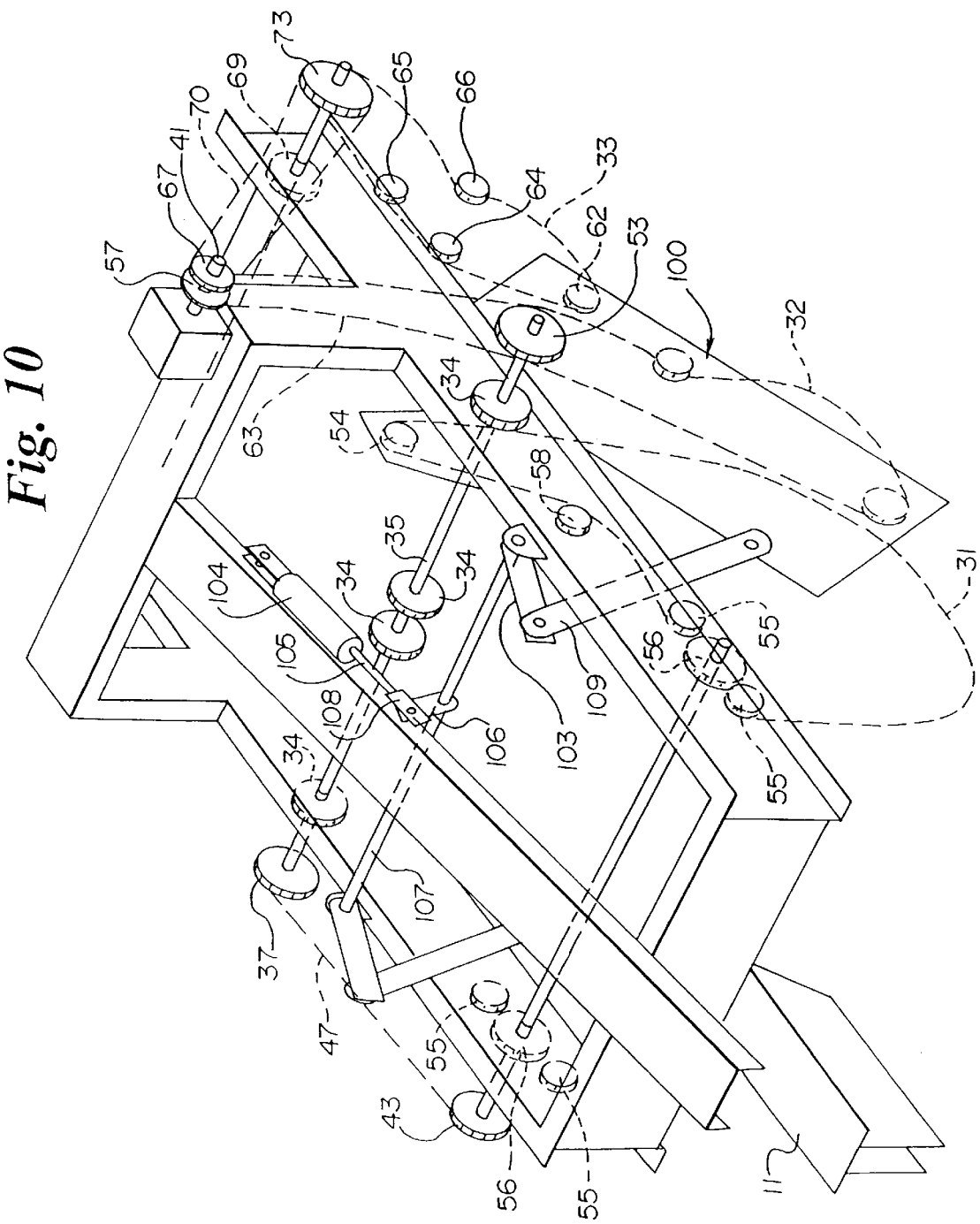
FIG. 10 is an isometric view of the apparatus of the present invention, with portions, removed for clarity.
Figure 11:
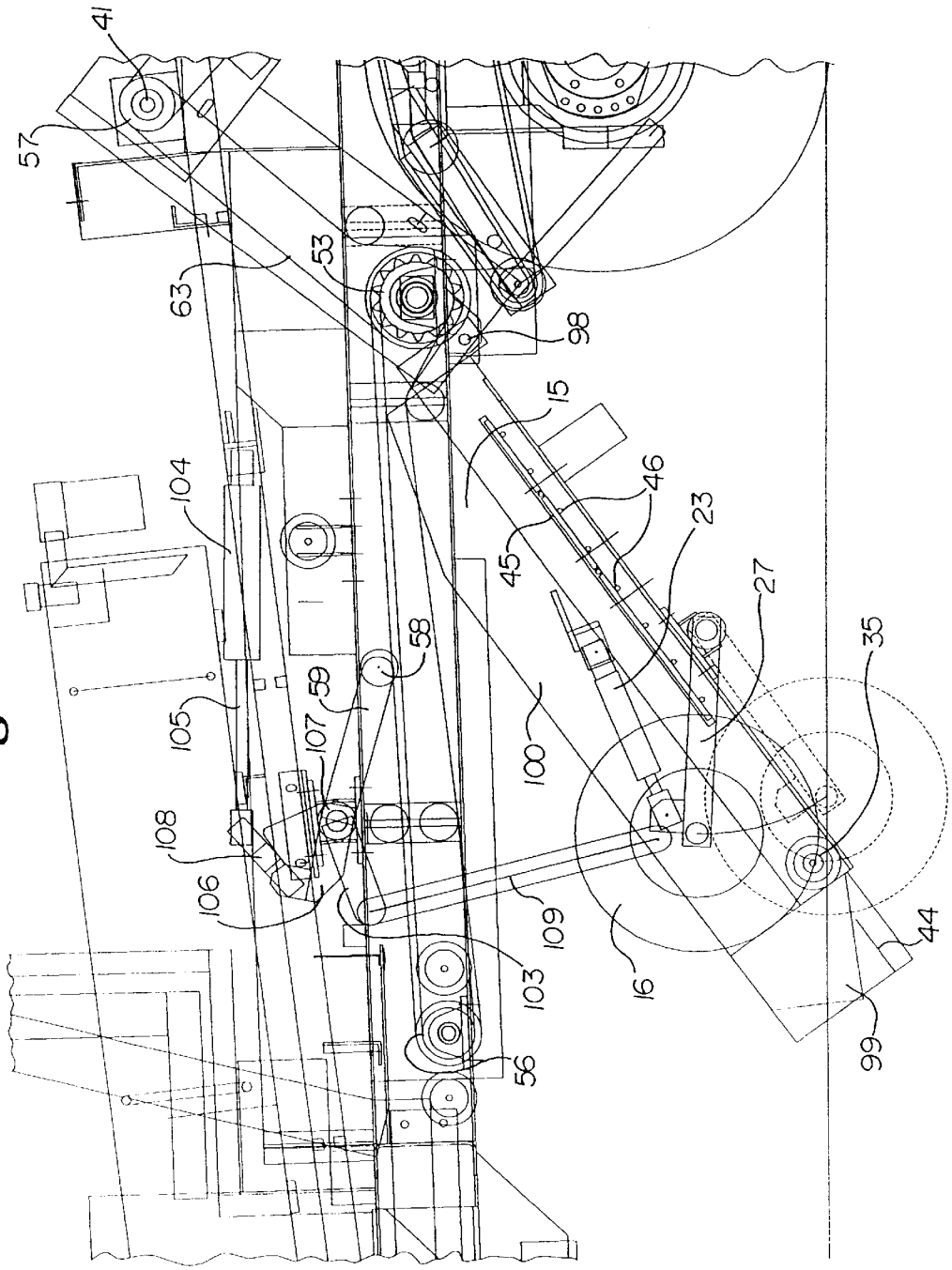
FIG. 11 is a side elevational view showing the lift mechanism for the digger section and with the digger section in a down position.
Figure 12:
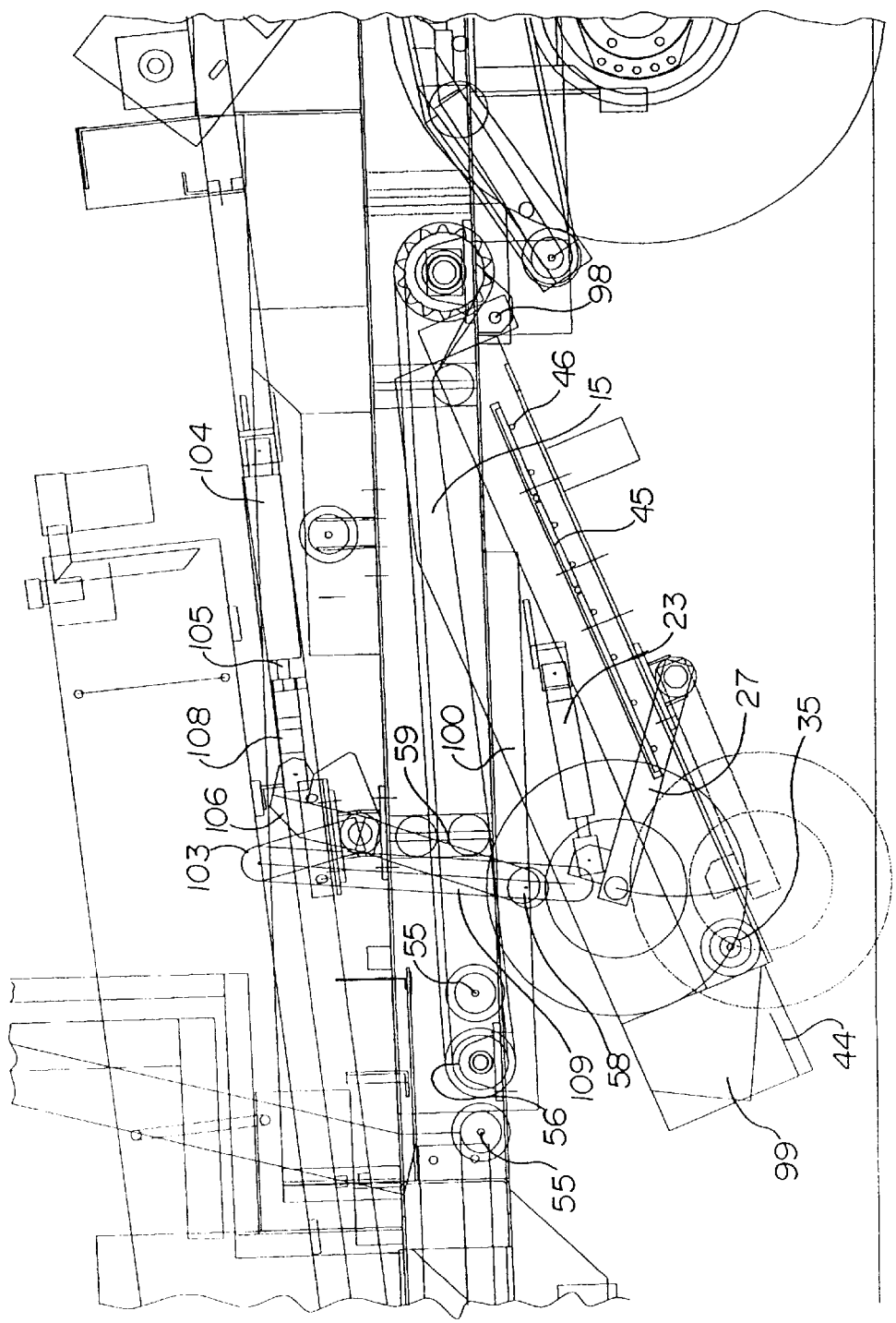
FIG. 12 is a view similar to that of FIG. 11 with the digger section in an up or transport position.

The details of the digger section 15 are illustrated best in FIGS. 10, 11 and 12. As shown, the digger section 15 is movable about the pivot 98 between a down or operative position in which the forward end 99 is at or below the beach sand surface 14 as shown in FIG. 11 and a raised or transport position in which the forward end 99 is raised above the beach surface 14 as shown in FIG. 12. During such movement, the digger section 15 is pivoted relative to the frame 11 about the pivot 98. As shown best in FIG. 13, the digger section 15 includes a pair of side panels 100, a central panel 100 and a plurality of edge slides or chain supports 102. The supports 102 are connected respectively to the inner surface of the side panels 100 and to both side surfaces of the central panel 101. The supports 102 function to support the top run of the digger chain 32 during operation.

A digger lift mechanism is connected between a portion of the vehicle frame and the side panels 100 to selectively raise and lower the digger section 15 between its operative and transport positions. The lift mechanism includes a lift cylinder 104 having one end connected to a portion of the implement frame and a piston rod 105 with a free end connected with a link 108. An opposite end of the link 108 is connected with a pivot link 106 which is rigidly connected with a pivot shaft 107 extending across the width of the implement and rotatably connected with a portion of the implement frame. A pair of pivot links 103 each have one end rigidly connected to the pivot shaft 107 and a second end pivotally secured to a respective lift link 109. The lift links 109 are in turn connected with the sides 100 of the digger section 15. By actuation of the cylinder 104 and extension and retraction of the piston rod 105, the digger section 15 can be moved between operative and transport positions as shown in FIGS. 11 and 12.

The forward end 99 of the digger section 15 includes a digger and can be selectively attached or removed depending upon whether it is desired for the digger section 15 to actually dig into the sand during cleaning or to merely skim the surface. If it is desired to skim the surface, the end 99 is removed.

The digger chain 32 extends across the width of the vehicle and is comprised of two endless chain sections 32a and 32b as shown best in FIGS. 7 and 13. The digger chain 32, and thus each of the digger chain sections 32a and 32b, travel in a closed loop digger chain path from drive sprockets 34 positioned at the upper end of the digger section 15, to and around a plurality of idler rollers 35 positioned at the lower end of the digger section 15 and back up to the drive sprockets 34 as shown in FIG. 9. The chain 32 is also supported on its underside between the rollers 35 and the sprockets 34 by the idler/support rollers 36.

The construction of the digger chain 32 is known as a belted chain which is shown in FIG. 14. Specifically, the belted chain in accordance with the preferred embodiment includes a pair of peripheral hard rubber cord sections 50,50 at its lateral edges and a plurality of generally cylindrical rods or links 51 extending between the cord sections 50. The links 51 are flattened at each of their ends and are riveted to the cord sections 50 by a plurality of rivets 52. The distances between the links or rods 51 of the digger chain are dependent upon the size of the debris or trash which is desired to be picked up. Generally, the distance between the lengths in the digger chain are on the order of 28 mm, 32 mm or 36 mm, although they can be wider or narrower. The links 51 of the preferred embodiment are cylindrical rods ½ inch or 7/16ths inch in diameter.

With reference to FIGS. 7 and 10, the upper ends of the digger chain sections 32a and 32b engage the toothed drive sprockets 34. The teeth of the sprockets 34 extend between the links 51 and drive the sections 32a and 32b. The drive sprockets 34 are positioned just inside the lateral cord sections 50,50 and accordingly function, in part, to maintain proper orientation of the chain sections 32a and 32b. The lower ends of the digger chain sections 32a and 32b extend around a plurality of idler rollers positioned in the area of the cord sections 50 to support the chain. The sprockets 34 are mounted on a drive axle 35 which is driven from the main drive shaft 41 via a pair of sprockets 53 and 57 and a roller chain 63 (FIG. 10).

As shown in FIGS. 7, 8, 9, 12 and 13, the digger section 15 is provided with a plurality of selectively removable slider pans 45 which are capable of being slid into an area beneath the upper run of the digger chain to prevent sand, debris and other articles from falling back to the beach after having been picked up by the digger belt 32. The pans 45 slide into an area immediately below the upper run of the belt 32 and are supported by a plurality of elongated rods 46 extending across the width of the implement. The pans 45 are selectively inserted from both sides of the implement and include handle portions 48 (FIG. 8) for manually inserting and removing the same. Fixed pans are provided at both the top and bottom of the digger section adjacent to the removable pans 45. The fixed pans, together with the removable pans, prevent debris from falling through the digger chain after pick-up.

The preferred construction of the sweeper belt 31 is similar to that of the digger belt 32 in that it is a belted chain as shown in FIG. 14. In the sweeper chain, however, the links are preferably spaced about 40 mm. Unlike the digger chain 32, however, only a single sweeper chain 31 extends across the entire width of the implement. The chain 31 is supported by the idler rollers 54 on each side of the implement and by the idler rollers 55, 55 on each side of the implement. The rollers 55,55 additionally function to maintain the chain 31 in engagement with a pair of drive sprockets 56. The sprockets 56 are positioned at each lateral side of the chain 31 immediately inside of the lateral cord portions 50 (FIG. 14). The chain 31 is also supported and guided by a pair of rollers 58 mounted on a distal end of a chain tension arm 59. The arm 59 is rigidly connected at its proximal end to the pivot shaft 107 and thus pivots with the shaft 107. As the arm 59 is rotated with the shaft 107 during movement of the digger section 15 to its transport position, the arm 59 moves the rollers 58 to a position which lifts the forward end of the chain off the ground to a transport position.

As shown best in FIGS. 6, 9 and 10, the sweeper chain 31 is an endless chain moving in a closed loop sweeper chain path and extends around the various rollers 54, 55 and 58 and around the drive sprocket 56. As it leaves the forward-most roller 55, the chain 31 extends downwardly to the sand or beach surface 14 where it is allowed to drag on that surface for a limited distance du ring operation. The belt 31 then extends upwardly along the digger section 15 as shown to the roller 54. During a portion of this movement, it is in engagement with the top run of the digger chain 32 (as shown best in FIG. 9) and moves upwardly along the digger section 15 in the same direction as the digger chain 32. As a result of this relationship between the digger and sweeper chains 32 and 31, cans and other debris are captured between the digger and sweeper chains as they converge toward one another to ensure that the debris is picked up. As shown best in FIG. 10, the sweeper chain 31 is driven from the digger drive axle 35 via a pair of toothed sprockets 37 and 43 and a roller chain 47.

The secondary or separation chain 33 is supported by a plurality of rollers 61, 62, 64, 65 and 66 and a drive sprocket 68. Similar to the sweeper belt 31, the secondary or separation chain 33 extends across the entire width of the implement. The drive sprockets 68 are positioned near each lateral edge of the chain 33 on a common drive axle 69. The drive axle 69 is driven from the drive axle 41 via a pair of sprockets 67 and 73 and a belt or chain 70. The specific construction of the separation chain 33 is shown in FIG. 16. Specifically, the chain 33 is a conventional chain known as a "fertilizer chain" having a desired mesh size to separate out trash, debris and other items of a certain size, but to allow sand, small shells and other items smaller than a certain size to fall freely back to the beach. The mesh size can be anything which is desired, but must be large enough to allow the sand to fall through. The mesh size of the chain 33 of the preferred embodiment is approximately ½ inch by 1 inch or ½ inch by ½ inch. The chain 33 is driven by the same drive axle 41 as the primary digger chain 32 and thus moves at approximately the same speed. Similar to the digger and sweeper chains, the separation chain 33 is an endless chain which moves in a closed loop separation chain path.

The rearward end of the implement is provided with a collection box 18 and a lift mechanism comprised of the lift linkage illustrated generally by the reference character 19. The lift linkage 19 includes a rigid support post 71 having one end connected with the vehicle frame 11 and a free end extending outwardly and rearwardly from the vehicle. A brace member 72 extends between a portion of the support 71 and the vehicle frame to maintain the support 71 in a fixed position. A pair of elongated lifting links 74 and 75 are pivotally connected at their upper ends to portions of the support 71 at the pivot points 76 and 78, respectively. The lower ends of the lifting links 74 and 75 are pivotally secured to opposite ends of a cross or "T" link 79 at the pivot points 80 and 81, respectively. The link 79 is also pivotally connected to the collection box 18 at the pivot 80.

A hydraulic dump cylinder 82 is rigidly connected with the collection box 18 and includes an extendable and retractable piston rod 84 connected to the link 79 at the pivot 85. A hydraulic lift cylinder 86 is mounted to the support post 71 and includes an extendable and retractable piston rod 88 having an outer end connected with a bracket portion 89 of the lift link 74. Both the dump cylinder 82 and the lift cylinder 86 are selectively provided with hydraulic fluid pressure from either the self-propelled vehicle or the towing vehicle. It can be seen that as the piston rod 88 of the cylinder 86 is extended, the lift links 74 and 75 will pivot in a generally counterclockwise direction as shown in FIGS. 1, 3 and 6 about the pivot points 76 and 78. Upon full extension of the piston 88, the links 74 and 75 will be pivoted to the position illustrated by the broken lines in the above figures. Because the link 74 is designed to be slightly longer than the link 75, upward pivotal movement of the links 74 and 75 as shown will result in the box 18 partially tipping outwardly in a clockwise direction. The specific lengths of the links 74 and 75 are designed for the box 18 to tip approximately 15 degrees during this movement. When the links 74 and 75 reach their top position as shown in FIGS. 1, 3 and 6, the cylinder 82 is actuated to finish pivoting the box 18 to empty the contents into a dump truck or other container.

Connected with the lift link 74 in the embodiments of FIGS. 1 and 3 and to the cross link or bracket 79 in the embodiment of FIG. 6 is a means for grooming the beach or sand during a cleaning operation. In the embodiments of FIGS. 1 and 3, this means includes a pair of support members 90,90 and a trailing grooming blade 91. The pair of support members 90,90 are connected to a respective one of the lift links 74 by a connecting member 92 as shown. The grooming member 91 is connected to a distal end of the support members 90 and extends laterally across the implement 10 as illustrated best in FIGS. 2 and 4. The bottom edge of the grooming member 91 is preferably provided with a plurality of serrated teeth or the like to provide a grooming pattern of desired configuration.

The grooming mechanism as shown in the embodiment of FIG. 6 includes a side support member 94 pivotally connected to the outer sides of the collection box 19 and a plurality of grooming tines or the like 95 extending laterally across the vehicle. The tines 95 are supported by a laterally extending support bar 93 which is in turn supported by the members 94. A hydraulic cylinder 96 is connected between a portion of the collection box 19 and the bar 93 for the purpose of raising and lowering the tines 95 and thus varying the force at which the tines rest against the sand as well as for the purpose of raising the grooming mechanism during transport.

Having described the structure of the preferred embodiment, the operation of the implement and the method aspect of the invention can be understood as follows. To prepare for operation, the digger section 15 is lowered to the desired level so that the forward end of the section 15 will either skim the beach surface 14 or dig into the sand to a desired depth. If skimming is desired, the forward digger blade section 99 of the digger section 15 is removed. This lowering of the digger section 15 is accomplished by appropriate actuation of the lift cylinder 104. Final adjustment is obtained by actuation of the cylinder 23.

Rotation of the power takeoff drive 24 (for the pull-type embodiment) or actuation of the hydraulic motor (for the self-propelled embodiment) causes corresponding movement of the sweeper chain 31, the digger chain 32 and the separator chain 33. While these chains are moving, forward movement of the implement will result in the sweeper chain 31 assisting in capturing cans, bottles and other debris between the sweeper chain 31 and the digger chain 32 and movement of such debris upwardly along the digger section 15 where it is emptied onto the secondary separator chain 33. At this point, the sand from the beach and other small items are allowed to fall through the mesh openings in the chain 33 and back to the beach, while the remaining debris is carried by the chain 33 and deposited in the collection box 18. During this operation, one or more of the slide pans 45 may be inserted or removed below the top run of the digger chain 32. If the sand is wet or if the digger is lowered to a significant depth, it is often desirable to remove one or more of the slide pans 45. On the other hand, if the sand is dry and the beach is merely being skimmed, all pans 45 should be in.

When the collection box 18 is full, the collection box 18 is emptied by actuating the lift cylinder 86 to lift the box to the position of the broken lines in FIGS. 1, 3 and 6. This is followed by actuation of the cylinder 82 to complete the tipping of the collection box and emptying its contents into a dump truck or other container.

Although the description of the preferred embodiment has been quite specific, it is contemplated that various modifications could be made without deviating from the spirit of the present invention. Accordingly, it is intended that the scope of the present invention be dictated by the appended claims rather than by the description of the preferred embodiment.

What is claimed is:

1. An apparatus for cleaning a beach surface comprising:
   a frame having a forward end and a rearward end;
   a digger section connected to said frame and extending forwardly and downwardly toward the beach surface;
   an endless digger chain carried by said digger section and moveable along an endless digger chain path, said digger chain having a forward end and a rearward end; and
   an endless sweeper chain having a portion positioned above said digger chain and moveable along an endless sweeper chain path, said sweeper chain having a forward end and a rearward end and being supported by a plurality of support members including a first support member positioned above said beach surface and forwardly of and above the forward end of said digger chain and a second support member positioned rearwardly of the forward end of said digger chain, said sweeper chain extending downwardly from said first support member for engagement with said beach surface forwardly of the forward end of said digger chain, said sweeper chain further engaging said digger chain during cleaning along a portion of said digger chain rearwardly of the forward end of said digger chain.

2. The apparatus of claim 1 including an endless separator chain having a portion positioned below and rearwardly of said digger chain and moveable along an endless separator chain path.

3. The apparatus of claim 2 including a collection box having a portion positioned below and rearwardly of said separator chain.

4. The apparatus of claim 3 including means for raising and emptying said collection box.

5. The apparatus of claim 1 wherein said sweeper chain is supported by a plurality of support rollers and driven by a sweeper chain drive sprocket.

6. The apparatus of claim 5 including a support arm having one end pivotable relative to said frame and a second end carrying a sweeper chain support roller, whereby rotation of said support arm in a first direction moves said sweeper chain to an operative position and rotation of said support arm in a second direction moves said sweeper chain to a transport position.

7. The apparatus of claim 1 including means for driving said digger chain and said sweeper chain.

8. The apparatus of claim 1 wherein said digger chain and said sweeper chain are belted chains.

9. The apparatus of claim 1 including sand grooming means positioned rearwardly of said digger section.

10. The apparatus of claim 1 including means for moving said digger section between an operative position and a transport position.

11. The apparatus of claim 10 including a support arm having one end pivotable relative to said frame and a second end carrying a sweeper chain support roller, whereby rotation of said support arm in a first direction moves said sweeper chain to an operative position and rotation of said support arm in a second direction moves said sweeper chain to a transport position.

12. The apparatus of claim 11 wherein said means for moving said digger section causes corresponding movement of said support arm in said first and second directions.

13. The apparatus of claim 1 wherein said sweeper chain is of sufficient length and said first support member is positioned sufficiently above said beach surface so that a portion of said sweeper chain extends downwardly by gravity from said first support member for engagement with the beach surface.

14. The apparatus of claim 13 wherein the entirety of said first support member is positioned above the forward end of said digger chain.

15. The apparatus of claim 1 wherein said first support member includes a sweeper chain drive member.

16. A method of cleaning a beach surface comprising:
   providing an apparatus with a frame having a digger section carrying an endless digger chain, said digger chain including forward and rearward ends;
   providing an endless sweeper chain having a portion supported by a first support member positioned above the beach surface and above and forwardly of the forward end of said digger chain; and
   moving said digger chain and said sweeper chain in respective closed loop paths such that a portion of said sweeper chain extends downwardly from said first support member for engagement with the beach surface forwardly of the forward end of said digger chain and for engagement with a portion of said digger chain rearwardly of the forward end of said digger chain.

17. The method of claim 16 including providing an endless separator chain rearwardly of said digger chain and moving said separator chain in a closed loop path.

18. The method of claim 16 including supporting said sweeper chain at a position entirely above the forward end of said digger chain so that said sweeper chain sags from said first support member by gravity for engagement with the beach surface and said digger chain.

19. The method of claim 16 including driving said first support member.

* * * * *